United States Patent [19]
Donguy

[11] 3,940,618
[45] Feb. 24, 1976

[54] SAMPLING DEVICE FOR THE ANALYSIS OF A FLUID

[75] Inventor: René Donguy, Verrieres le Buisson, France

[73] Assignee: Commissariat a l'Energie Atomique, Paris, France

[22] Filed: May 15, 1974

[21] Appl. No.: 470,113

[30] Foreign Application Priority Data
May 21, 1973 France .................................. 73.18377

[52] U.S. Cl. ............. 250/304; 250/364; 250/432 R; 250/436
[51] Int. Cl.² .................. G01N 21/24; G01N 31/00
[58] Field of Search ........... 250/432, 435, 436, 304, 250/364

[56] References Cited
UNITED STATES PATENTS

| | | | |
|---|---|---|---|
| 3,005,101 | 10/1961 | Bradford | 250/364 |
| 3,200,041 | 8/1965 | Ralfe et al. | 250/364 |
| 3,724,956 | 4/1973 | Neary | 250/364 |

*Primary Examiner*—Harold A. Dixon
*Attorney, Agent, or Firm*—Lane, Aitken, Dunner & Ziems

[57] ABSTRACT

A sample of hot fluid under pressure circulating in a main circuit is admitted into a cavity formed within a sampling unit. The temperature and pressure of the fluid within the cavity are brought to the same conditions as in the main circuit and the cavity is then isolated after thermal stabilization of the main circuit. The sampling unit is isolated, then cooled in order to reduce the pressure within the cavity. A supporting shield which normally covers a thin window formed in the bottom cavity wall is withdrawn by sliding and the fluid is analyzed across the window.

13 Claims, 1 Drawing Figure

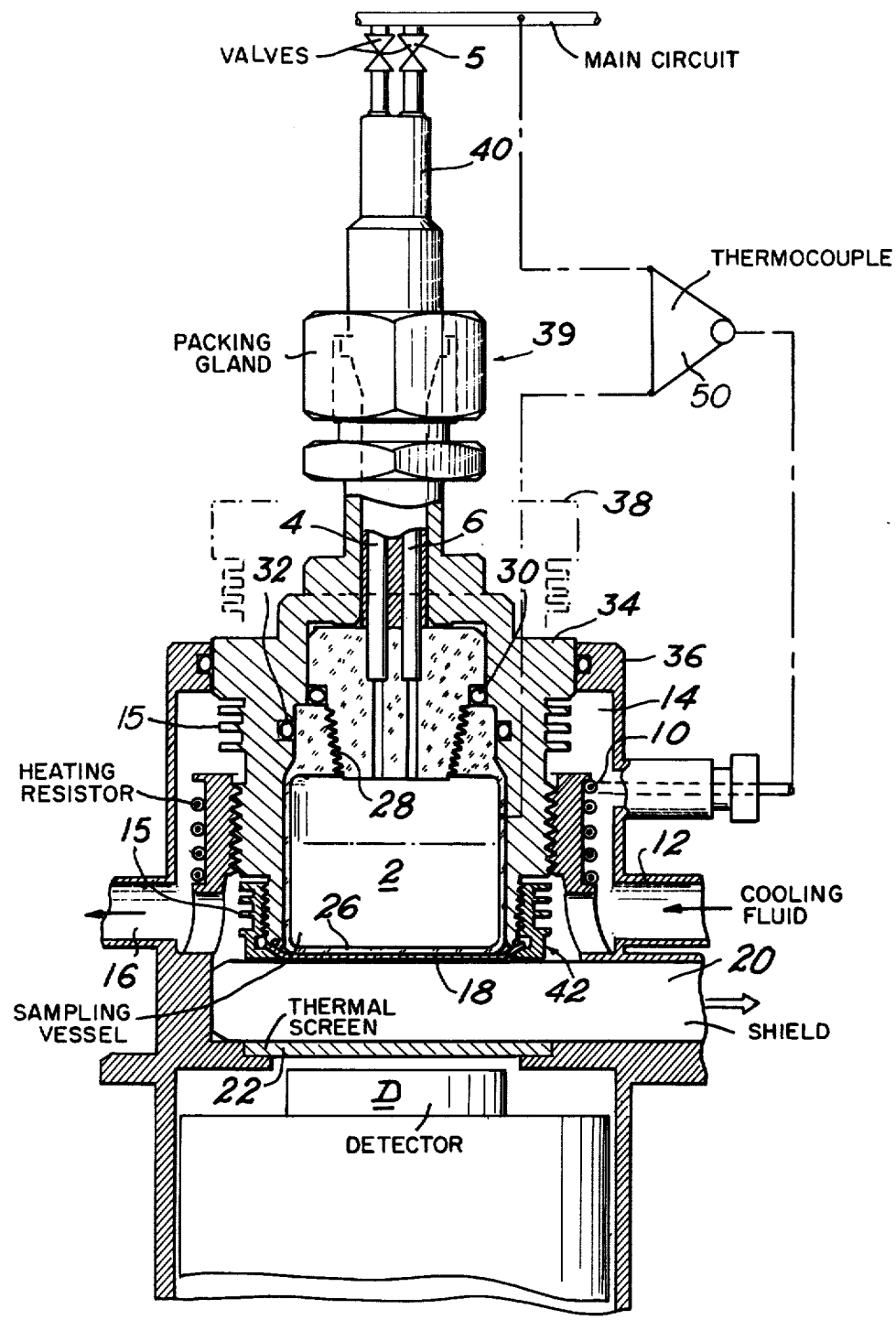

SAMPLING DEVICE FOR THE ANALYSIS OF A FLUID

This invention relates to a sampling device for the analysis of a volume of fluid.

As is already known, it often proves necessary to take a sample which is representative of a volume of fluid contained in a given circuit and which contains the same proportions of product as those existing within the circuit.

A particularly noteworthy application is in the field of nuclear reactor technology in which the radioactive products formed at the time of fission reactions have to be detected either in the primary fluid or in the purification liquid. It is accordingly necessary to sample a volume of liquid in order to perform various analyses which indicate variations in the concentrations of radioactive products. If these variations are substantial and give rise to a burst of additional radioactive substances, they point either to a can failure (fission products) or to the presence of radioactive impurities (activation products).

In nuclear reactors, can failures are detected by means of a number of methods including the following:
detection of delayed neutrons,
measurement of total gamma activity,
measurement of the beta activity of the collected fission products,
gamma-ray spectrometry of the circulating water,
gamma-ray spectrometry of a collected water sample.

The advantage of gamma-ray spectrometry lies in the possibility of determining whether the activity results from the activation products or from the fission products by identifying the nuclides which are responsible for the increase in activity and then by determining their relative abundance. It is known that the fission products have very different half-lives and consequently have a relative abundance which is different according to whether there is an open fracture of the can which allows substantial bursts of short-lived fission gases or else a slow and progressive leakage of long-lived fission gases: identification of the fission products makes it possible to characterize the fracture or crack formation in the fuel can; for example the presence of short-lived products such as I and Br which are emitters of delayed neutrons indicates an open fracture.

It is known that gamma-ray spectrometry of circulating water which is sometimes designated as in-line spectrometry is attended by a large number of disadvantages:

a. this method of spectrometry can be carried out only across walls of substantial thickness and capable of withstanding pressures of several hundred bars which exist within the reactor fluid. These substantial thicknesses do not permit detection of low-energy gamma rays which are absorbed in the wall, b. it is not possible to separate substances having very closely adjacent peaks such as argon-41 and iron-59; these substances can be identified only by measurements of radioactive decay, thereby entailing the need for separate sampling and for a study of its time-dependent variation, c. the measured volume located opposite to the detector is not defined with accuracy, d. in a detection of low gamma activities, it is important to ensure that the detector is not blinded by a high-energy radiation. This phenomenon can be avoided either by increasing the transit time and thus eliminating the short-lived emitters which often have the highest energies or by increasing the distance between the detector and the fluid volume to be analyzed and consequently reducing the solid angle of detection or alternatively by interposing a screen for absorbing the gamma rays (a lead screen, for example).

In order to overcome these disadvantages, gamma-ray spectrometry has been performed on samples collected in tube coils having substantial lengths of 40 to 60 meters and small diameters. The small diameter of the walls made it possible to measure gamma rays of lower energy but there remained a disadvantage in that a tube coil has the effect of producing a pressure drop within the pipes and reducing the temperature of the fluid, with the result that the sampling operation does not take place under the same conditions as those which exist in the liquid of the fission reactor. The method of sampling by means of tube coils does permit the possibility of carrying out measurements of radioactive decay after isolating the tube-coil circuit but suffers from a major drawback in that a large number of fission products are trapped in a non-uniform manner on the cold walls of the tube coil.

This invention relates to a method whereby a volume of hot fluid under pressure circulating in a main circuit is sampled in a cavity formed within the interior of a sampling unit, said sampling operation being carried out for the purpose of analyzing the fluid which is isolated within said cavity, characterized in that a sample of the fluid is collected and introduced into a cavity which is heated in order to bring the conditions of temperature and pressure of the fluid within the cavity to the same values as in the main circuit and that said cavity is then isolated after thermal stabilization of the main circuit, that the sampling unit is cooled after isolation in order to reduce the pressure within the cavity, and that the thickness of one of the walls is then reduced to a thin window and the fluid is analyzed across said thin window.

It is readily apparent that the window is transparent within the range of wavelengths in which the measurement is performed. If the measurement is optical in the visible region of the spectrum, the window must be transparent to optical wavelengths. If the measurement is carried out by the detection of gamma radiation having a given energy, the window must be transparent to gamma radiations corresponding to energies of this order.

The device for carrying out the method essentially comprises a sampling unit having a cavity which forms a container, an inlet pipe and an outlet pipe which both connect the cavity within the sampling unit to the main circulation circuit, said pipes being fitted with control valves, means for heating, measuring and regulating the temperature of the fluid within the cavity, an admission duct and a discharge duct for connecting a separate coolant circuit to a recessed ring which surrounds the cavity of the sampling unit, a thin window constituting one wall of the cavity and applied against a retractable supporting block, and a radiation detection system protected by a thermal screen and located opoosite to said window. The metallic wall is common with the cavity which forms a container for the fluid and the recessed ring in which the coolant circulates is provided with cooling fins.

A preferential application of the device according to the invention consists in withdrawing a volume of water from a nuclear reactor of the pressurized-water type and is distinguished by the fact that the means for heating the sampling unit is a heating resistor and that the means for temperature measurement and regulation is a thermocouple connected between the sampling unit and the main fluid circuit, said thermocouple being intended to produce action on the means for heating the sampling unit in order to cancel the potential difference developed at the terminals of the thermocouple and resulting from the temperature difference between the sampling unit and the circuit, and that the fluid employed for cooling said sampling unit to a reference value is compressed air, that the window employed is of small thickness and has a low gamma-ray absorption capacity, said window being applied against a block which serves as a support and is withdrawn at the time of measurement of the radiation.

It is thus possible to collect a reactor coolant fluid, for example under the operating conditions of said reactor together with all the active products contained therein, and also to carry out in a short time an analysis of these products by gamma-ray spectrometry across a thin wall. The retractable block of substantial thickness consolidates the thin window when the liquid within the sampling unit is at high pressure and is then withdrawn so as to leave during measurement of radiation only a small thickness which is transparent to gamma rays and even low-energy gamma rays.

In one embodiment of the invention, the device comprises an automatic control chain which produces sequential action and can be started-up at will so as to open the valves and connect the sampling unit to the main liquid-circulation circuit, to adjust the temperature of the sampling unit to that of said circuit, to close the control valves, to circulate the fluid within a duct in order to cool the sampling unit, and to cause the rapid withdrawal of the block supporting the thin window when the temperature of the sampling unit is brought below a reference value.

The device aforesaid makes it possible to take samples which are representative of fluid in the form of liquid, gas or vapor within a leak-tight circuit at any predetermined pressure and temperature in order to carry out subsequent analysis of any desired character. The design principle of the device is such that the fluid to be sampled is caused to circulate within a leak-tight sampling circuit, said circulation being carried out at the same values of temperature and pressure as the main circuit in order to conform to the operating conditions of this latter. Control of temperature and pressure is carried out automatically in relation with measurements performed in the main circuit. The sampling circuit can be placed either as a by-pass off the main circuit in order to recover the fluid or in the discharge circuit. When the fluid which circulates within the sampling circuit is brought to the same conditions as the main circuit and well stabilized, the circulation flow is abruptly interrupted on each side of the sampling unit.

The device comprises a preset program. The downstream valve is usually closed first, with the result that the sampled fluid is wholly isolated within the sampling unit under normal operating conditions. If the liquid is under high pressure as is the case in pressurized-water reactors, the sampling unit is first isolated, then depressurized by reducing its temperature by means of an external source (flow of air, water, liquid nitrogen and the like); cold-point trapping of the elements is thus performed within the sampling unit and not at uncontrolled points as is the case in the tube-coil method. Said depressurization is necessary when the sampling analysis is to be performed through a thin window of the unit which could not afford resistance to the high pressure.

In accordance with the invention, the supporting shield is withdrawn rapidly and automatically by a motor or a jack as soon as the temperature falls below the reference value.

The spectrometric analysis is performed across the thin wall alone in order to cause the minimum disturbance in the number of disintegrations arising from the sampled fluid which encounters the detection head. This system makes it possible to perform quantitative determination at absolute value of the nuclides which are present within the sampling unit. The small thickness of the window facilitates detection of low energies. In fact, the displacement of the movable shield is carried out very rapidly in order to carry out analysis by gamma-ray spectrometry immediately after cooling with a view to permitting detection of the short-lived active products.

In an alternative embodiment of the invention, the device comprises a system for automatic start-up of the control chain, said start-up being initiated by an alarm signal derived from an auxiliary device for total counting of radiations.

A better understanding of the invention will in any case be gained from the following description of one embodiment of the invention which is given by way of nonlimitative example.

Reference is made in the description to the accompanying FIGURE which shows a constructional diagram of the device.

As already mentioned in the foregoing, the device consists in introducing a liquid into a sampling unit under the same conditions of temperature and pressure as in the circuit from which it has been withdrawn, whereupon this volume of liquid is first isolated and then cooled in order to reduce the pressure within the interior of the sampling unit, thereby making it possible to uncover a thin window and to carry out the detection of gamma radiations, for example, across said window.

The small diameter of the pipes within the sampling circuit and the sufficiently low rate of flow of liquid result in negligible pressure drops between the sampling unit and the main circuit.

One form of construction of the device according to the invention is illustrated in FIG. 1 and comprises the sampling unit 2 within which the volume of liquid is sampled, said liquid being supplied through a pipe 4 and withdrawn through the pipe 6. The pipes are fitted with control and isolating valves 5. The sampling unit is brought to the reference temperature by means of a heating resistor 10. The junctions of a thermocouple 50 are connected to the main circuit and to the sampling vessel 26, and the output of the thermocouple is connected to the heating resistor 10. The thermocouple 50 operates in a conventional manner to control the heat applied by the heating resistor 10 in response to the temperature difference between the main circuit and the sampling vessel, it being understood that other conventional components normally associated with this type circuit, such as an amplifier and power supply, may also be provided. The sampling unit is cooled by a fluid under pressure which is admitted through the tube 12, circulates within a ring 14 provided with cooling fins such as the fin 15 and is then discharged at 16. The sampling unit comprises a thin window 18 applied against a movable shield 20 which is retractable. The detector D is separated from the sampling unit by a thermal screen 22.

In one of its alternative embodiments, the invention comprises a removable leak-tight vessel 26 in which the fluid is circulated and which is formed of teflon, for example. The vessel which is interposed between the fluid and the cavity has the advantage:

of dispensing with the time-consuming and costly operation involved in decontamination of the cavity, of preventing materials included in the stainless steel (chromium, for example) from impairing the accuracy of the chemical sampling analyses.

The sampling vessel 26 is made up of two parts joined together by means of the frusto-conical threaded portion 28. The seals 30 and 32 serve to insulate the sampling vessel from the frame 34. Said frame 34 is screwed into the frame 36; the position of the frame 36 prior to screwing is shown in a chain-dotted line at 38. The packing bland 39 serves to fix the frame 38 on the body 40 which contains the pipes 4 and 6. After insertion of the sampling vessel 26, the ring 42 is screwed onto the frame 34 and applies the thin window 18 against the sampling vessel 26. Said vessel 26 is removed from the unit by disassembly of the packing gland 39, unscrewing of the frame 34 and the ring 42.

One of the most important industrial applications of the device is the detection of burst fuel cans; a device of this type is made fully automatic by making use of electrovalves for isolating the sampling unit when the conditions of temperature are satisfied and a motor is controlled in dependence on a measurement of pressure in order to withdraw the movable shield located beneath the thin window.

At the time of an increase in the total gammaradiation activity which is detected by the burst can detection gear of a nuclear reactor, the causes of this upward progression must be rapidly determined in order to continue to operate under good conditions. In other words, it is necessary to know whether said increase in gamma activity is due to an increase in the rate of production of activation products or to the appearance of the fission products. Should the latter be the case, a can failure is therefore the underlying cause of the fault condition. Expressed differently, the invention makes it possible to determine the emitting nuclides and to trace the cause of their production in order to take the necessary steps for ensuring good operation of the reactor on the basis of these findings. In the case of appearance of fission products, the steps referred-to above consist in shutdown of the reactor and discharge of the defective fuel element or in a reduction in power. In the case of appearance of activation products, said steps entail remedial action on the circuits for filtration and purification of ion-exchange resin, or the introduction of products which modify the pH (lithium oxide) or soluble poisons and so forth. For this reason, the sampling unit is incorporated with the alarm and detection system in order to permit automatic counting for the detection of the different nuclides when the total gamma activity rate given by another counting station exceeds a predetermined limit.

These measurements are a function of the type of crack which gives rise to emission of fission products in the coolant. This type of crack can be determined by identification of said fission products by gamma-ray spectrometry. This identification achieves a very high standard of precision in the device claimed since the products can be trapped only within the sampling unit 2.

What we claim is:

1. A method of sampling fluid circulating in a main circuit, said method comprising the steps of withdrawing a sample of said fluid from said main circuit and introducing said sample into a cavity which is heated in order to bring the conditions of temperature and pressure of the fluid within the cavity to the same values as in the main circuit, allowing said fluid to thermally stabilize, isolating said cavity from said main circuit after thermal stabilization, cooling said sampling unit after isolation, reducing the thickness of one of the walls defining said cavity to a thin window, and analyzing the fluid across said window.

2. The method of claim 1 wherein said cavity is defined in a housing, one wall of which is formed by said window which is normally shielded, and wherein said step of reducing comprises the step of removing the shield from said window.

3. A device for sampling fluid, comprising means defining a cavity, an inlet pipe and an outlet pipe connecting said cavity to a source of said fluid, control valves associated with said pipes for selectively controlling the flow of fluid into and from said cavity, means for controlling the temperature of the fluid within said cavity, said cavity defining means including a window for permitting the fluid in said housing to be analyzed by an external system, and shield means movable relative to said window between a first position in which it shields said cavity from said system and a second position in which it uncovers said window to permit analysis of said fluid by said system.

4. The device of claim 3 further comprising a removable leak-tight sampling vessel disposed within said cavity, said pipes extending within said vessel to circulate said fluid through said vessel.

5. The device of claim 3 wherein said external system is a spectrometer.

6. The device of claim 3 wherein said external system is a radiation detector.

7. The device of claim 3 wherein said temperature control means comprises means for circulating a coolant in a heat exchange relation to said housing.

8. The device of claim 7 wherein said cavity defining means includes at least one external wall over which said coolant circulates, and further comprising a plurality of heat exchange fins formed on said wall.

9. The device of claim 3 wherein said temperature control means comprises an electrical heating device in a heat exchange relation with said cavity defining means.

10. The device of claim 9 wherein said temperature control means further comprises means for circulating a coolant in a heat exchange relation to said housing.

11. The device of claim 9 further comprising means for measuring the amount of electrical heat applied to said cavity defining means.

12. The device of claim 11 further comprising means for varying the amount of heat applied to said housing.

13. The device of claim 12 wherein said measuring means comprises a thermocouple connected between said cavity defining means and said source of fluid, said thermocouple being in an operative relation with said electrical heating device to cancel the potential difference developed at the terminals of the thermocouple and resulting from the temperature difference between said cavity defining means and said source.

\* \* \* \* \*